United States Patent
Iraha

(10) Patent No.: US 8,210,988 B2
(45) Date of Patent: Jul. 3, 2012

(54) VEHICLE CONTROLLER AND CONTROL METHOD

(75) Inventor: Taira Iraha, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 355 days.

(21) Appl. No.: 12/686,777

(22) Filed: Jan. 13, 2010

(65) Prior Publication Data

US 2010/0204011 A1 Aug. 12, 2010

(30) Foreign Application Priority Data

Jan. 13, 2009 (JP) ................................ 2009-004961

(51) Int. Cl.
*F16H 61/58* (2006.01)
*F16D 35/00* (2006.01)
(52) U.S. Cl. ........................................ 477/65; 192/3.31
(58) Field of Classification Search .................... 477/39, 477/64, 65, 78; 701/67
See application file for complete search history.

(56) References Cited

U.S. PATENT DOCUMENTS

| | | | | |
|---|---|---|---|---|
| 4,468,988 A | * | 9/1984 | Hiramatsu | 477/65 |
| 4,706,790 A | * | 11/1987 | Lockhart et al. | 192/3.3 |
| 5,160,003 A | | 11/1992 | Suzuki | |
| 5,413,539 A | * | 5/1995 | Leonard et al. | 475/63 |
| 5,626,536 A | * | 5/1997 | Kono et al. | 477/181 |
| 5,719,768 A | * | 2/1998 | Tashiro et al. | 701/67 |
| 5,733,223 A | * | 3/1998 | Matsubara et al. | 477/175 |
| 5,803,868 A | * | 9/1998 | Kono et al. | 477/168 |
| 6,039,675 A | * | 3/2000 | Adachi et al. | 477/174 |
| 6,066,072 A | * | 5/2000 | Adachi | 477/176 |
| 6,085,136 A | * | 7/2000 | Katakura et al. | 701/51 |
| 6,132,336 A | * | 10/2000 | Adachi et al. | 477/169 |
| 6,217,481 B1 | * | 4/2001 | Watanabe et al. | 477/169 |
| 6,652,415 B2 | * | 11/2003 | Segawa et al. | 477/62 |
| 6,860,834 B2 | * | 3/2005 | Segawa et al. | 477/180 |
| 6,876,913 B2 | * | 4/2005 | Segawa et al. | 701/67 |

(Continued)

FOREIGN PATENT DOCUMENTS

JP 2-38751 2/1990

(Continued)

OTHER PUBLICATIONS

Office Action issued Nov. 30, 2010, in Japan patent Application No. 2009-004961 (with English translation).

(Continued)

*Primary Examiner* — Dirk Wright
(74) *Attorney, Agent, or Firm* — Oblon, Spivak, McClelland, Maier & Neustadt, L.L.P.

(57) ABSTRACT

The invention relates to a controller for a vehicle having installed thereon a drive power source, a transmission, and a torque converter that is equipped with a lockup clutch and is provided between the drive power source and the transmission. The controller includes a detection unit that detects an actual revolution speed of the drive power source, and a control unit that controls the lockup clutch so that a state of the lockup clutch becomes any state from among a disengaged state, an engaged state, and a slip state. When executing a slip control, the control unit compares the actual revolution speed with the target revolution speed, and feedback controls a transmission torque of the lockup clutch on the basis of a comparison result of the actual revolution speed and a target revolution speed so as to cause the actual revolution speed to follow the target revolution speed.

11 Claims, 5 Drawing Sheets

U.S. PATENT DOCUMENTS

| | | | |
|---|---|---|---|
| 6,928,357 B2 * | 8/2005 | Higashimata et al. | 701/87 |
| 7,008,344 B2 * | 3/2006 | Aikawa et al. | 475/127 |
| 7,085,640 B2 * | 8/2006 | Segawa et al. | 701/67 |
| 7,346,442 B2 * | 3/2008 | Higashimata et al. | 701/67 |
| 7,361,120 B2 * | 4/2008 | Iida et al. | 477/65 |
| 7,630,811 B2 * | 12/2009 | Jiang | 701/54 |
| 7,769,517 B2 * | 8/2010 | Segawa et al. | 701/68 |
| 7,769,518 B2 * | 8/2010 | Segawa et al. | 701/68 |
| 7,854,683 B2 * | 12/2010 | DeGeorge et al. | 477/176 |
| 2004/0082434 A1 | 4/2004 | Segawa et al. | |

FOREIGN PATENT DOCUMENTS

| | | |
|---|---|---|
| JP | 3-292462 | 12/1991 |
| JP | 4-290675 | 10/1992 |
| JP | 6-72661 | 9/1994 |
| JP | 8-219276 | 8/1996 |
| JP | 10-61760 | 3/1998 |
| JP | 10-122355 | 5/1998 |
| JP | 11-94068 | 4/1999 |
| JP | 2004-44757 | 2/2004 |
| JP | 2004-144262 | 5/2004 |
| JP | 2004-251325 | 9/2004 |
| JP | 2005-3193 | 1/2005 |
| JP | 2005-16563 | 1/2005 |
| JP | 2008-208929 | 9/2008 |

OTHER PUBLICATIONS

Office Action issued on Jul. 5, 2011 in the corresponding Japanese Application No.: 2009-004961 (with English Translation).

Office Action issued May 2, 2012 in Chinese Patent Application No. 201010003905.6, 6 pages.

* cited by examiner

VEHICLE CONTROLLER AND CONTROL METHOD

INCORPORATION BY REFERENCE

The disclosure of Japanese Patent Application No. 2009-004961 filed on Jan. 13, 2009, including the specification, drawings and abstract is incorporated herein by reference in its entirety.

BACKGROUND OF THE INVENTION

1. Field of the Invention

The invention relates to a controller and a control method for a vehicle in which a torque converter equipped with a lockup clutch is installed between a drive power source and a transmission.

2. Description of the Related Art

A technology is available by which when a lockup clutch that can directly couple an input side and an output side of a torque converter is controlled, a control region is set that provides a microslip to the lockup clutch, whereby the lockup actuation range is expanded and fuel consumption performance is improved. Such a control is called a flex lockup control, a slip lockup control, or simply a flex control or a slip control. A technique for conducting such a slip control of a lockup clutch when a vehicle starts moving is disclosed for example in Japanese Patent Application Publication No. 2005-3193 (JP-A-2005-3193).

A controller for a lockup clutch for a vehicle disclosed in JP-A-2005-3193 determines a target engine revolution speed for obtaining an engine output torque corresponding to the actual accelerator depression amount or throttle opening degree, and calculates a target slip amount (=target engine revolution speed−actual turbine revolution speed) for obtaining the target engine revolution speed. The controller also controls a torque capacity (transmission torque) of the lockup clutch so that the actual slip amount (=actual engine revolution speed−actual turbine revolution speed) of the lockup clutch is caused to follow the aforementioned target slip amount. Thus, where the actual slip amount is less than the target slip amount, the torque capacity (transmission torque) of the lockup clutch is reduced by a predetermined value and the actual slip amount is increased, and where the actual slip amount is less than the target slip amount, the torque capacity (transmission torque) of the lockup clutch is increased by a predetermined value and the actual slip amount is reduced.

However, the controller disclosed in JP-A-2005-3193 is limited to causing the actual slip amount to follow the target slip amount during slip control, and the possibility of causing an engine operation point (in particular, engine revolution speed) to follow accurately the optimum point of fuel consumption during the slip control is not considered. As a result, a sufficient room is left for further improving fuel consumption.

SUMMARY OF THE INVENTION

The invention provides a controller and a control method that can improve fuel consumption when a lockup clutch is controlled to a slip state in a vehicle in which a torque converter equipped with a lockup clutch is installed between a drive power source and a transmission The first aspect of the invention relates to a vehicle controller. This controller controls a vehicle having installed thereon a drive power source, a transmission, and a torque converter that is equipped with a lockup clutch and is provided between the drive power source and the transmission. The controller includes a detection unit that detects an actual revolution speed indicating a real revolution speed of the drive power source and a control unit that controls the lockup clutch so that a state of the lockup clutch becomes any state from among a disengaged state, an engaged state, and a slip state that is intermediate between the disengaged state and the engaged state. The control unit determines, based on a state of the vehicle, whether to execute a slip control for controlling the lockup clutch to the slip state, sets a target revolution speed indicating a target value of the revolution speed of the drive power source on the basis of the state of the vehicle, and when executing the slip control, compares the actual revolution speed with the target revolution speed, and feedback controls a transmission torque of the lockup clutch on the basis of a comparison result of the actual revolution speed and the target revolution speed so as to cause the actual revolution speed to follow the target revolution speed.

The second aspect of the invention relates to a controller for a vehicle. The controller controls a vehicle having installed thereon a drive power source, a transmission, and a torque converter that is equipped with a lockup clutch and is provided between the drive power source and the transmission. The controller includes a detection unit that detects an actual revolution speed indicating a real revolution speed of the drive power source, and a control unit that controls the lockup clutch so that a state of the lockup clutch becomes any state from among a disengaged state, an engaged state, and a slip state that is intermediate between the disengaged state and the engaged state. The control unit is provided with a determination unit that determines, based on a state of the vehicle, whether to execute a slip control for controlling the lockup clutch to the slip state; a setting unit that sets a target revolution speed indicating a target value of the revolution speed of the drive power source on the basis of the state of the vehicle; and a feedback control unit that, when executing the slip control, compares the actual revolution speed with the target revolution speed and feedback controls a transmission torque of the lockup clutch on the basis of a comparison result of the actual revolution speed and the target revolution speed so as to cause the actual revolution speed to follow the target revolution speed.

The third aspect of the invention relates to a control method for a vehicle. The control method is a control method for a vehicle having installed thereon a drive power source, a transmission, and a torque converter that is equipped with a lockup clutch and is provided between the drive power source and the transmission. The control method includes detecting an actual revolution speed that indicates a real revolution speed of the drive power source, and controlling the lockup clutch so that a state of the lockup clutch becomes any state from among a disengaged state, an engaged state, and a slip state that is intermediate between the disengaged state and the engaged state. The process of controlling the lockup clutch is conducted by determining, based on a state of the vehicle, whether to execute a slip control for controlling the lockup clutch to the slip state; setting a target revolution speed indicating a target value of the revolution speed of the drive power source on the basis of the state of the vehicle; and when executing the slip control, comparing the actual revolution speed with the target revolution speed and feedback controlling a transmission torque of the lockup clutch on the basis of a comparison result of the actual revolution speed and the target revolution speed so as to cause the actual revolution speed to follow the target revolution speed.

With the controller and control method according to the above-described aspects of the invention, fuel consumption can be improved when a lockup clutch is controlled to a slip state in a vehicle in which a torque converter equipped with a lockup clutch is installed between a drive power source and a transmission.

BRIEF DESCRIPTION OF THE DRAWINGS

The foregoing and further features and advantages of the invention will become apparent from the following description of preferred embodiments with reference to the accompanying drawings, wherein like numerals are used to represent like elements and wherein.

DETAILED DESCRIPTION OF EMBODIMENTS

Figure 1:
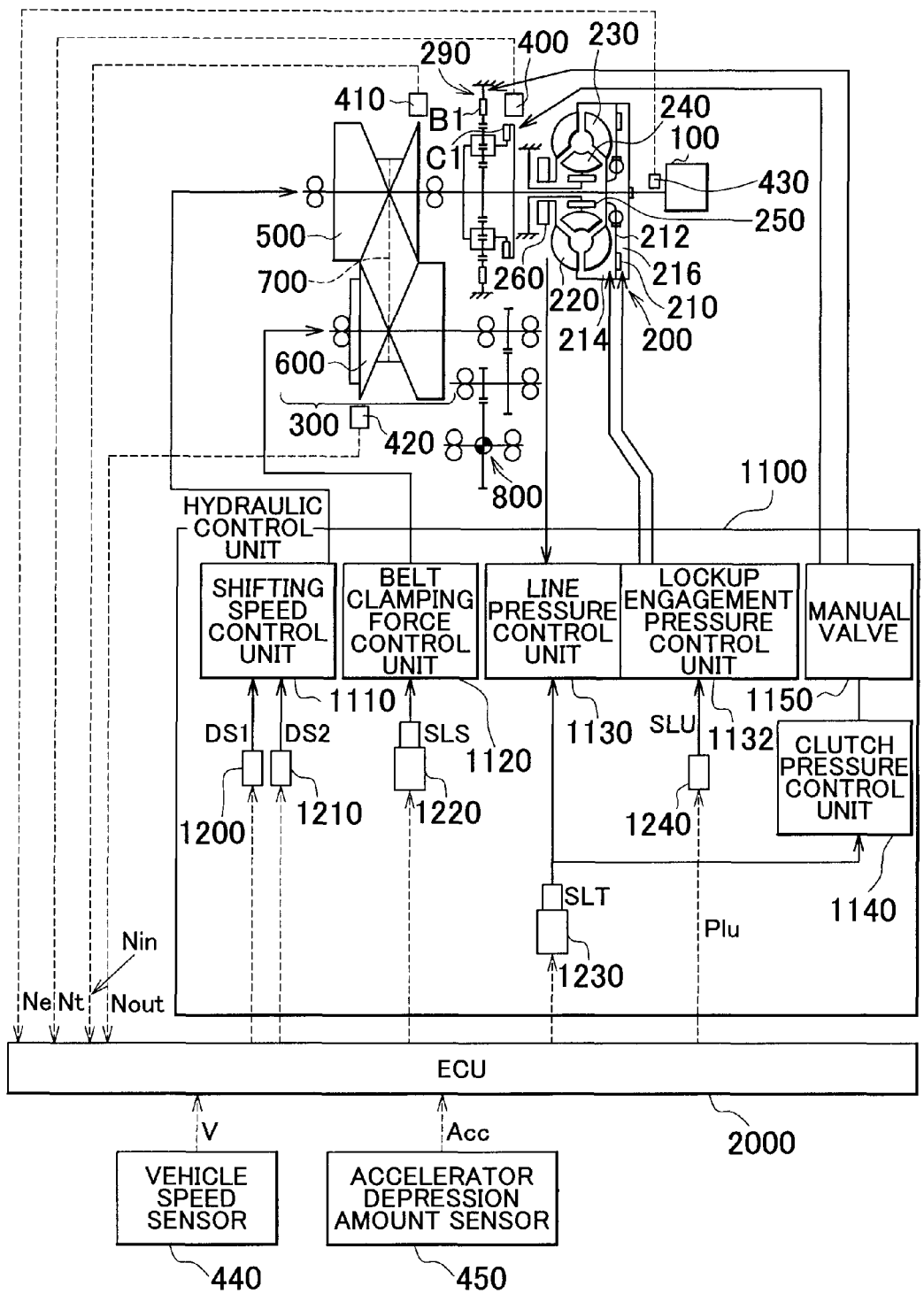
FIG. 1 illustrates a power train of the vehicle.

Embodiments of the invention will be described below with reference to the appended drawings. In the description, like components will be assigned with like reference numerals. Names and functions thereof are identical. Therefore, these components will not be redundantly explained in details.

A power train of a vehicle that carries the controller of the present embodiment will be explained below with reference to FIG. 1. The invention can be applied to a vehicle in which a torque converter equipped with a lockup clutch is installed between a drive power source (for example, an engine) and a transmission. A case in which a continuously variable transmission is installed as the transmission will be explained below by way of example, but the transmission is not limited to a continuously variable transmission and may be a gear transmission.

As shown in FIG. 1, the power train of the vehicle is composed of an engine 100, a torque converter 200, a forward-reverse switching unit 290, a belt-type continuously variable transmission 300, a differential gear 800, a hydraulic control unit 1100, and an ECU 2000.

An output shaft of the engine 100 is connected to an input shaft of the torque converter 200. The engine 100 and the torque converter 200 are coupled by a rotary shaft. Therefore, an output shaft revolution speed (engine revolution speed) Ne of the engine 100 that is detected by an engine revolution speed sensor 430 is equal to an input shaft revolution speed of the torque converter 200.

The torque converter 200 is composed of a lockup clutch 210, a pump impeller 220 at the input shaft side, a turbine impeller 230 at the output shaft side, and a stator 240 having a one-way clutch 250 and demonstrating a torque amplification function.

An engagement oil chamber 214 and a disengagement oil chamber 216 that are divided by a piston 212 are provided inside the torque converter 200.

Where a value obtained by subtracting a hydraulic pressure inside the disengagement oil chamber 216 from the hydraulic pressure inside the engagement oil chamber 214 is taken as a hydraulic pressure difference ΔP, the increase in the hydraulic pressure difference ΔP moves the piston 212 to the engagement side. Where the lockup clutch 210 applies a pressure to the pump impeller 220 and the lockup clutch 210 assumes a direct coupling state (completely engaged state) because of the movement of the piston 212 to the engagement side, a state is assumed in which the pump impeller 220 at the input shaft side and the turbine impeller 230 at the output shaft side are directly coupled.

Where the hydraulic pressure difference ΔP decreases, the piston 212 moves to the disengagement side. Where the lockup clutch 210 assumes a disengaged state because of this movement of the piston 212 to the disengagement side, the turbine impeller 230 at the output shaft side is driven by the torque transmitted by the torque converter 200.

Where the hydraulic pressure difference ΔP is within a range between a value during direct coupling and a value during disengagement, the lockup clutch 210 is in a slip state and the turbine impeller 230 at the output shaft side is driven by a torque that is a sum total of the torque transmitted by the torque converter 200 and the torque transmitted by the lockup clutch 210.

The pump impeller 220 at the input shaft side is provided with an oil pump 260 that is actuated following the rotation of the pump impeller 220 at the input shaft side. The oil pump 260 is, for example, a gear pump and supplies a hydraulic pressure to various solenoids of the hydraulic control unit 1100.

The belt-type continuously variable transmission 300 is connected to the torque converter 200 via the forward-reverse switching unit 290.

The forward-reverse switching unit 290 has a double-pinion planetary gear, a reverse brake B1, and an input clutch C1. The input clutch C1 is also called a forward clutch and is necessarily used in an engaged state when the vehicle moves forward, that is, not in the parking (P) position, R position, or N position.

The belt-type continuously variable transmission 300 is composed of an input primary pulley 500, an output secondary pulley 600, and a metallic belt 700 wound on the primary pulley 500 and secondary pulley 600. The primary pulley 500 is composed of a fixed sheave that is fixed to a primary shaft and a movable sheave that is only slidable supported on the primary shaft. The secondary pulley 600 is composed of a fixed sheave that is fixed to a secondary shaft and a movable sheave that is only slidable supported on the secondary shaft.

A groove width between the fixed sheaves and movable sheaves of the pulleys 500, 600 is continuously changed by controlling the hydraulic pressure supplied to hydraulic actuators (none is shown in the figures) of the primary pulley 500 and secondary pulley 600. As a result, the winding radius of the belt is changed and shifting is conducted.

The hydraulic control unit 1100 includes a shifting speed control unit 1110, a belt clamping force control unit 1120, a line pressure control unit 1130, a lockup engagement pressure control unit 1132, a clutch pressure control unit 1140, and a manual valve 1150.

The shifting speed control unit 1110 controls the hydraulic pressure supplied to the hydraulic actuator of the primary pulley 500 correspondingly to the hydraulic pressure outputted from a first solenoid 1200 for shifting control and a second solenoid 1210 for shifting control. The gear ratio of the belt-type continuously variable transmission 300 is thereby controlled.

The belt clamping force control unit 1120 controls the hydraulic pressure supplied to the hydraulic actuator of the secondary pulley 600 correspondingly to the hydraulic pressure outputted from a linear solenoid 1220 for belt clamping force control. The belt clamping force is thereby controlled.

The line pressure control unit 1130 controls a line pressure correspondingly to the hydraulic pressure outputted from a linear solenoid 1230 for line pressure control. The line pressure as referred to herein is a hydraulic pressure obtained by regulating the hydraulic pressure supplied by the oil pump 260 with a regulator valve (not shown in the figure).

The lockup engagement pressure control unit 1132 controls the aforementioned hydraulic pressure difference ΔP (=hydraulic pressure in the engagement oil chamber 214—hydraulic pressure in the disengagement oil chamber 216) and controls the engagement force (transmitted torque) of the lockup clutch 210 correspondingly to the hydraulic pressure outputted from a linear solenoid 1240 for lockup engagement pressure control. Depending on the size of this engagement force, the lockup clutch 210 is controlled to any one of the disengagement state, direct coupling state, and slip state (state intermediate between the disengagement state and direct coupling state). The transmitted torque Tlu of the lockup clutch 210 has a minimum value in the disengagement state, increases as the hydraulic pressure difference ΔP increases in the slip state, and has a maximum value in the direct coupling state.

The manual valve 1150 is actuated to switch hydraulic paths as the driver operates a shift lever. The clutch pressure control unit 1140 controls the hydraulic pressure supplied from the manual valve 1150 to the input clutch C1 or reverse brake B1 correspondingly to the hydraulic pressure outputted from the linear solenoid 1230 for line pressure control.

A vehicle speed sensor 440, an accelerator depression amount sensor 450, a turbine revolution speed sensor 400, a primary pulley revolution speed sensor 410, and a secondary pulley revolution speed sensor 420 are connected by a harness to the ECU 2000. The vehicle speed sensor 440 detects a vehicle speed V. The accelerator depression amount sensor 450 detects an operation amount of an accelerator pedal (accelerator depression amount) ACC. The turbine revolution speed sensor 400 detects an output shaft revolution speed (turbine revolution speed) Nt of the torque converter 200. The primary pulley revolution speed sensor 410 detects a revolution speed (primary pulley revolution speed) Nin of the primary pulley 500. The secondary pulley revolution speed 420 detects a revolution speed (secondary puller revolution speed) Nout of the secondary pulley 600. These sensors output the signals that represent the detection results to the ECU 2000.

The ECU 2000 regulates the hydraulic pressure outputted from each solenoid by outputting the respective control signals (hydraulic pressure command values) to the solenoids of the hydraulic control unit 1100 on the basis of the detection results of the sensors.

The ECU 2000 executes the slip control that sets the lockup clutch 210 into a slip state with the object of improving, if possible, the fuel consumption, without losing the operability. In a vehicle that carries a continuously variable transmission, as in the present embodiment, the slip control of the lockup clutch 210 is generally executed when the vehicle starts moving. Therefore, in the explanation below, the slip control performed when the vehicle starts moving (referred to hereinbelow "slip start control") will be explained.

The ECU 2000 controls the lockup clutch 210 to the slip state by increasing or decreasing the hydraulic pressure difference ΔP within a range between the values assumed when the lockup clutch 210 is in the directly coupled state and the disengagement state.

Figure 2:
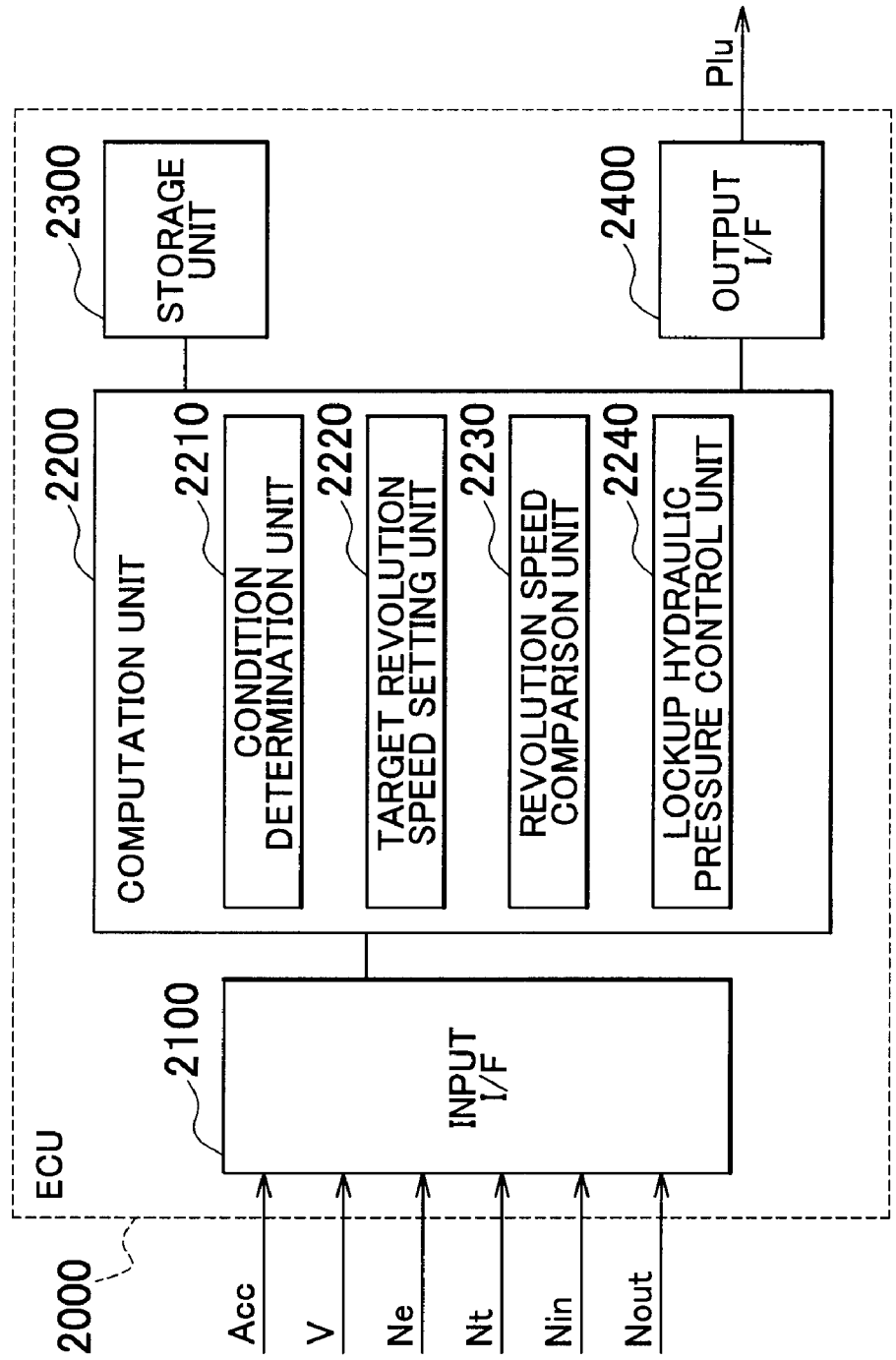
FIG. 2 is a functional block diagram of an Electronic Control Unit (ECU)

FIG. 2 shows a functional block diagram of the ECU 2000 at the time the lockup clutch 210 is controlled. The ECU 2000 includes an input interface 2100, a computation unit 2200, a storage unit 2300, and an output interface 2400.

The input interface 2100 receives detection signals from sensors and sends the received signals to the computation unit 2200. Various kinds of information, programs, threshold values, maps, and the like are stored in the storage unit 2300. As necessary, data are read from the computation unit 2200 or stored therein.

The computation unit 2200 includes a condition determination unit 2210, a target revolution speed setting unit 2220, a revolution speed comparison unit 2230, and a lockup hydraulic pressure control unit 2240.

The condition determination unit 2210 determines whether start conditions and end conditions of slip start control are fulfilled. The condition determination unit 2210 determines whether the present travel state of the vehicle is included in any region from among a disengagement region, slip start control region, and direct coupling region. For example, when the accelerator pedal is depressed and the turbine revolution speed Nt changes from a value that is lower than a threshold to a value that is higher than the threshold (a case in which the vehicle starts moving), the condition determination unit 2210 determines that the travel state of the vehicle is included in the slip start control region. When the lockup clutch 210 assumes an almost direct coupling state during the slip start control (when the turbine revolution speed Nt and engine revolution speed Ne are almost synchronized in a state in which the turbine revolution speed Nt is greater than the threshold value), the condition determination unit 2210 determines that the travel state of the vehicle is included in the direct coupling region. Further, when the vehicle is stopped or in a state immediately prior to stopping (the vehicle speed V becomes less than the threshold value), the condition determination unit 2210 determines that the travel state of the vehicle is included in the disengagement region.

Where the travel state of the vehicle makes a transition from the disengagement region to the slip start control region, the condition determination unit 2210 determines that the start condition of the slip start control is fulfilled. Where the travel state of the vehicle makes a transition from the slip start control region to the disengagement region or direct coupling region, the condition determination unit 2210 determines that the end condition of the slip start control is fulfilled.

Figure 3:
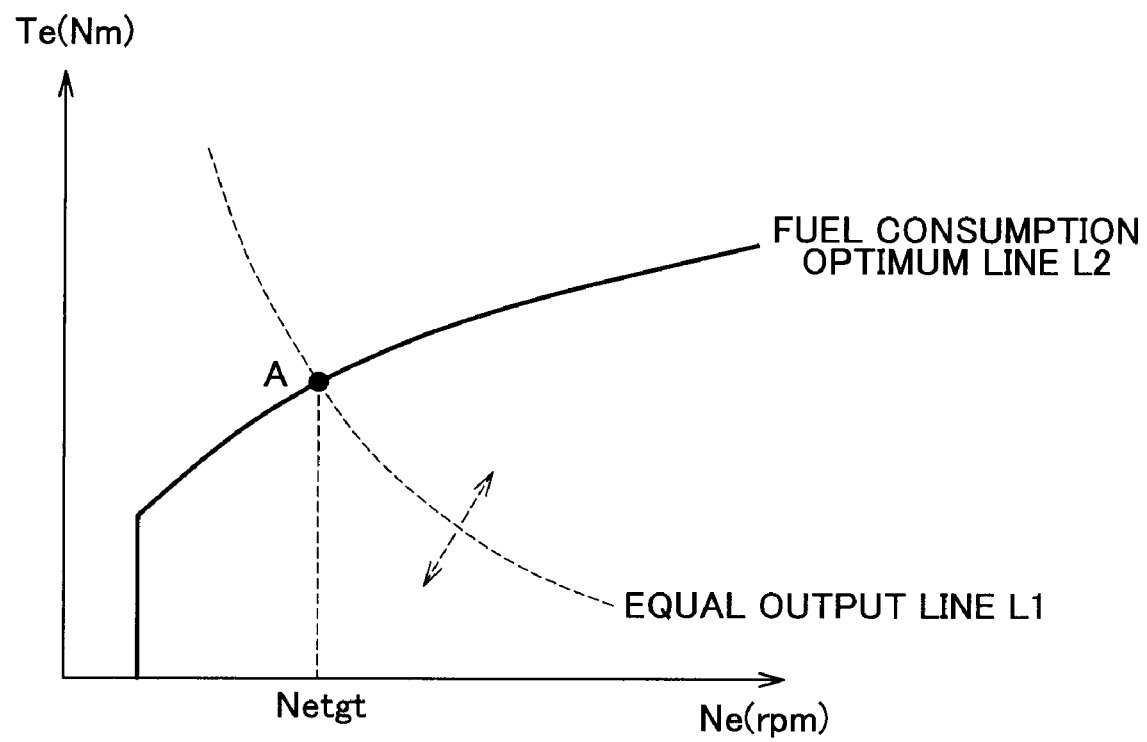
FIG. 3 is a map illustrating a fuel consumption optimum line.

The target revolution speed setting unit 2220 sets the target engine revolution speed Netgt correspondingly to the vehicle speed V and accelerator depression amount ACC. FIG. 3 is a map that shows a fuel consumption optimum line that is used for setting the target engine revolution speed Netgt. In FIG. 3, an engine torque Te is plotted against the ordinate, and an engine revolution speed Ne is plotted against the abscissa. The fuel consumption optimum line L2 is a line found by tests in advance that connects the combinations of the engine revolution speed Ne and engine torque Te at which the fuel consumption is optimum.

The target revolution speed setting unit 2220 initially sets a target engine output correspondingly to the vehicle speed V and accelerator depression amount ACC. Where the vehicle speed V is the same, the target revolution speed setting unit 2220 sets the target engine output to a larger value as the accelerator depression amount ACC increases. Then, the target revolution speed setting unit 2220 sets an equal output line L1 on which the set target engine output (a product of the engine revolution speed Ne and engine torque Te) is constant on the map shown in FIG. 3. Therefore, as the target engine output increases, the equal output line L1 moves to the upper right side in FIG. 3, and as the target engine output decreases, the equal output line moves to the lower left side in FIG. 3. Then, the target revolution speed setting unit 2220 finds an intersection point A of the equal output line L1 and fuel consumption optimum line L2 on the map shown in FIG. 3 and sets the engine revolution speed Ne corresponding to the intersection point A as the target engine revolution speed Netgt. The target engine revolution speed Netgt may be also set by other methods.

The revolution speed comparison unit 2230 compares the engine revolution speed (actual engine revolution speed) Ne detected by the engine revolution speed sensor 430 with the target engine revolution speed Netgt and outputs the comparison result to the lockup hydraulic pressure control unit 2240.

When the start condition of the slip start control is fulfilled and before the end condition of the slip start control is fulfilled, the lockup hydraulic pressure control unit 2240 controls a hydraulic pressure command value Plu of the linear solenoid 1240 for lockup engagement pressure control so as to cause the actual engine revolution speed Ne to follow the target engine revolution speed Netgt. In the explanation below, it is assumed that the hydraulic pressure difference ΔP of the lockup clutch 210 increases with the increase in the hydraulic pressure command value Plu.

In a case where the actual engine revolution speed Ne is lower than the target engine revolution speed Netgt, the lockup hydraulic pressure control unit 2240 decreases the hydraulic pressure command value Plu by a predetermined value in order to decrease the hydraulic pressure difference ΔP. As a result, the transmitted torque (engagement force) of the lockup clutch 210 decreases and a load applied to the engine 100 decreases. Therefore, the actual engine revolution speed Ne rises and comes close to the target engine revolution speed Netgt. By contrast, where the actual engine revolution speed Ne is higher than the target engine revolution speed Netgt, the lockup hydraulic pressure control unit 2240 increases the hydraulic pressure command value Plu by a predetermined value in order to increase the hydraulic pressure difference ΔP. As a result, the transmitted torque (engagement force) of the lockup clutch 210 increases and a load applied to the engine 100 increases. Therefore, the actual engine revolution speed Ne decreases and comes close to the target engine revolution speed Netgt.

Where the end condition of the slip start control is fulfilled, the lockup hydraulic pressure control unit 2240 executes the usual control and controls the lockup clutch 210 to either of the disengagement state and direct coupling state correspondingly to the travel state of the vehicle. More specifically, where the travel state of the vehicle is included in the direct coupling region, the lockup hydraulic pressure control unit 2240 sets the hydraulic pressure command value Plu to the maximum value (hydraulic pressure difference ΔP assumes a maximum value) and sets the lockup clutch 210 in the direct coupling state. Where the travel state of the vehicle is included in the disengagement region, the lockup hydraulic pressure control unit 2240 sets the hydraulic pressure command value Plu to the minimum value (hydraulic pressure difference ΔP assumes a minimum value) and sets the lockup clutch 210 in the disengagement state.

The above-described functions may be realized with software or hardware.

Figure 4:
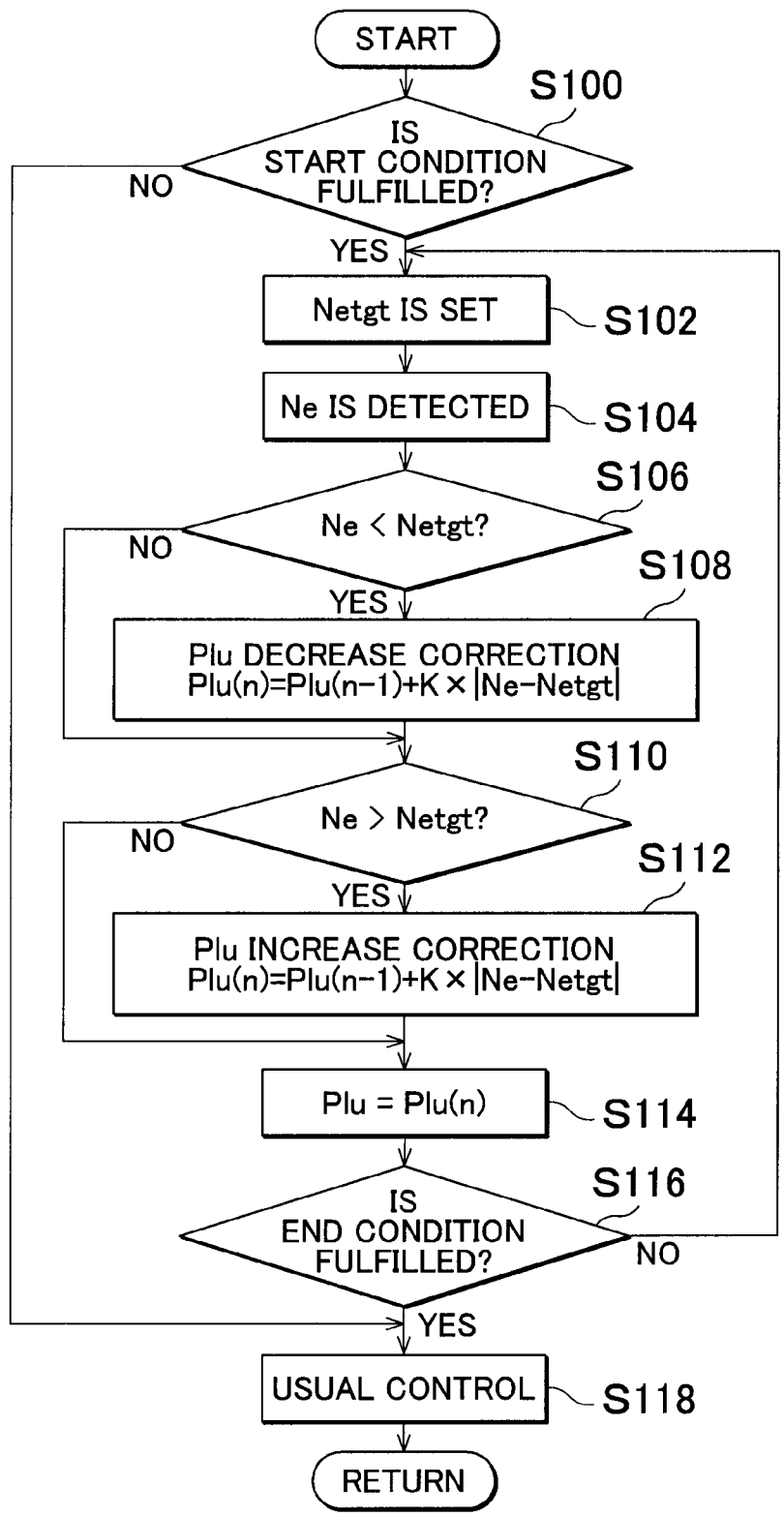
FIG. 4 is a figure (1st) illustrating a processing flow of the ECU.

FIG. 4 is a processing flow of the ECU 2000 in a case where the above-described functions are realized with software. The processing flow shown in FIG. 4 is repeatedly executed with a predetermined cycle time.

In step ("step" is abbreviated hereinbelow as "S") 100, the ECU 2000 determines whether the start condition of the slip start control is fulfilled. Where a positive determination is made in this processing (YES in S100), the processing flow advances to S102 and the slip start control is started. Otherwise (NO in S100), the processing advances to S118 and the usual control is performed).

In S102, the ECU 2000 sets the target engine revolution speed Netgt correspondingly to the vehicle speed V and accelerator depression amount ACC. For example, as described hereinabove, the ECU 2000 sets the target engine revolution speed Netgt by using the fuel consumption optimum line L2 shown in FIG. 3. In S104, the ECU 2000 detects the actual engine revolution speed Ne.

In S106, the ECU 2000 determines whether the actual engine revolution speed Ne is lower than the target engine revolution speed Netgt. Where the actual engine revolution speed Ne is determined to be lower than the target engine revolution speed Netgt in this processing (YES in S106), the processing advances to S108. Otherwise (NO in S108), the processing flow advances to S110.

In S108, the ECU 2000 conducts a decrease correction of the hydraulic pressure command value Plu. The ECU 2000 calculates the hydraulic pressure command value Plu(n) in the present cycle time by decreasing the hydraulic pressure command value Plu(n−1) in the previous cycle time by a value of feedback gain K×|Ne−Netgt|. Thus, the ECU 2000 calculates Plu(n)=Plu(n−1)−K×|Ne−Netgt|. The feedback gain K is a positive constant.

In S110, the ECU 2000, determines whether the actual engine revolution speed Ne is higher than the target engine revolution speed Netgt. Where the actual engine revolution speed Ne is determined to be higher than the target engine revolution speed Netgt in this processing (YES in S110), the processing advances to S112. Otherwise (NO in S110), the processing flow advances to S114.

In S112, the ECU 2000 conducts an increase correction of the hydraulic pressure command value Plu. The ECU 2000 calculates the hydraulic pressure command value Plu(n) in the present cycle time by increasing the hydraulic pressure command value Plu(n−1) in the previous cycle time by a value of feedback gain K×|Ne−Netgt|. Thus, the ECU 2000 calculates Plu(n)=Plu(n−1)+K×|Ne−Netgt|.

In S114, the ECU 2000 sets the hydraulic pressure command value Plu(n) that has been calculated in the present cycle time as the hydraulic pressure command value Plu and sends it to the linear solenoid 1240 for lockup engagement pressure control.

In S116, the ECU 2000 determines whether the end condition of the slip start control is fulfilled. Where a positive determination is made in this processing (YES in S116), the processing flow advances to S118. Otherwise (NO in S116), the processing flow returns to S102, the slip start control (processing of S102 to S114) is continued, and the increase/decrease of the hydraulic pressure command value Plu is repeated.

In S118, the ECU 2000 conducts the usual control. In the usual control, as described above, the lockup clutch 210 is controlled to either of the disengagement state and the direct coupling state correspondingly to the travel state of the vehicle.

The operation of the lockup clutch 210 controlled by the ECU 2000 of the present embodiment on the basis of the above-described structure and flowcharts will be explained below.

Let us assume that the vehicle has stopped. In this case, the start condition of the slip start control is not fulfilled (NO in S100) and the lockup clutch 210 is controlled to the disengagement state by the usual control (S118).

Then, where the driver steps on the accelerator pedal to move the vehicle, the actual engine revolution speed Ne starts rising and, with a small delay, the turbine revolution speed Nt also starts increasing. Where the turbine revolution speed Nt further increases and exceeds the threshold, the start condition of the slip start controlled is fulfilled (YES in S100) and the slip start control (processing of S102 to S114) is executed.

When the slip start control is executed, the slip amount of the torque converter 200 follows the target slip amount under the control according to the related art. Therefore, it is necessary to calculate the target slip amount by using the turbine revolution speed Nt. However, the turbine revolution speed Nt is greatly affected by a detection error caused by noise or the like, driver's operations (braking, shifting), and changes in the travel environment such as pavement. Therefore, the target slip amount can shift from the value that has to be the original target. As a result, it is possible that the slip amount of the torque converter 200 will shift from the value that has to be the original target.

By contrast, the ECU 2000 of the present embodiment directly compares the actual engine revolution speed Ne and target engine revolution speed Netgt (S106, S110) and feedback controls the hydraulic pressure command value Plu on the basis of the comparison result so as to cause the actual engine revolution speed Ne to follow the target engine revolution speed Netgt (S108, S112).

Thus, the ECU 2000 of the present embodiment conducts feedback control of the hydraulic pressure command value Plu, without using the turbine revolution speed Nt that can be a factor decreasing the control accuracy. As a result, the actual engine revolution speed Ne can be caused to follow the target engine revolution speed Netgt with better accuracy than in the case where the slip amount of the torque converter 200 is caused to follow the target clip amount (control according to the related art).

Furthermore, the ECU 2000 of the present embodiment sets the target engine revolution speed Netgt by using the fuel consumption optimum line L2 shown in FIG. 3 (S102). Thus, during the slip start control, the actual engine revolution speed Ne is controlled to a value that takes into account the optimum fuel consumption of the engine 100. Therefore, fuel consumption can be sufficiently improved over that in a case where the engine revolution speed is simply reduced during the slip start control.

As described above, when the controller of the present embodiment conducts the slip control of a lockup clutch in a vehicle having installed therein a torque converter equipped with the lockup clutch, the controller directly compares the actual engine revolution speed with a target engine revolution speed that has been set with consideration for the optimum fuel consumption and feedback controls the hydraulic pressure of the lockup clutch on the basis of the comparison result so as to cause the actual engine revolution speed to follow the target engine revolution speed. As a result, the actual engine revolution speed can be caused to follow with good accuracy the target engine revolution speed that takes into account the optimum fuel consumption, and fuel consumption can be thereby improved.

VARIATION EXAMPLE

In the above-described embodiment, the feedback gain in a case in which the hydraulic pressure command value Plu is decreased is taken to be equal to the feedback gain in a case in which the hydraulic pressure command value is increased, but the feedback gain in a case in which the hydraulic pressure command value Plu is decreased may be made larger than the feedback gain in a case in which the hydraulic pressure command value is increased. Thus, the ECU 2000 in the above-described embodiment may execute the processing flow shown in FIG. 5 instead of that shown in FIG. 4 described above.

Figure 5:
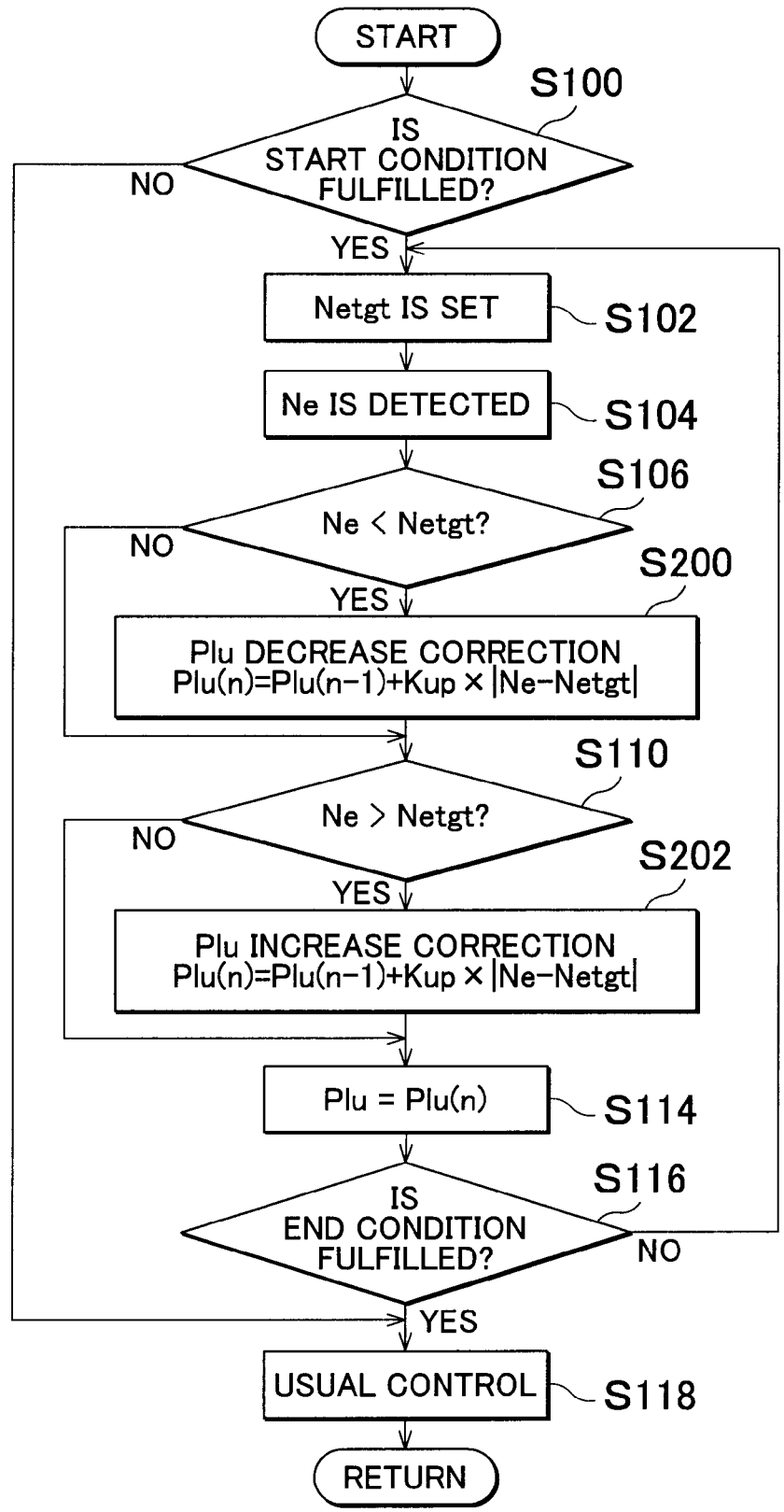
FIG. 5 is a figure (2nd) illustrating a processing flow of the ECU.

The processing flow executed by the ECU 2000 of the variation example of the present embodiment will be explained below with reference to FIG. 5. The processing steps in the processing flow shown in FIG. 5 that are identical to those of the above-described processing shown in FIG. 4 will be assigned with the same numbers and detailed explanation thereof will not be herein repeated.

In S200, the ECU 2000 conducts the decrease correction of the hydraulic pressure command value Plu. In this case the ECU 2000 calculates the hydraulic pressure command value $Plu(n)$ in the present cycle time as $Plu(n-1)-$feedback gain $Kdown \times |Ne-Netgt|$. The feedback gain Kdown is a positive constant and has a value larger than that of the below-described feedback gain Kup.

In S202, the ECU 2000 conducts the increase correction of the hydraulic pressure command value Plu. In this case the ECU 2000 calculates the hydraulic pressure command value $Plu(n)$ in the present cycle time as $Plu(n-1)+$feedback gain $Kup \times |Ne-Netgt|$. The feedback gain Kup is a positive constant and has a value smaller than that of the above-described feedback gain Kdown.

Thus, where the feedback gain Kdown is larger than the feedback gain Kup the decrease speed of the hydraulic pressure command value Plu (that is, the decrease speed of the hydraulic pressure difference $\Delta P$) becomes larger than the increase speed of the hydraulic pressure command value Plu (that is, the increase speed of the hydraulic pressure difference $\Delta P$ that is equal to the increase speed of the transmitted torque of the lockup clutch 210), provided that $|Ne-Netgt|$ has the same value. As a, result, the decrease speed of the transmitted torque of the lockup clutch 210 (that is, the increase speed of the actual engine revolution speed Ne) becomes larger than the increase speed of the transmitted torque of the lockup clutch 210 (that is, the decrease speed of the actual engine revolution speed Ne). As a result, an abrupt decrease in the actual engine revolution speed Ne can be prevented. Therefore, the actual engine revolution speed can be caused to follow with good accuracy the target engine revolution speed that takes into account the optimum fuel consumption and also fuel consumption can be improved, in the same manner as in the above-described embodiment, while adequately preventing the engine from stalling.

While the invention has been described with reference to example embodiments thereof, it is to be understood that the invention is not limited to the described embodiments or constructions. The invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A controller for a vehicle having installed thereon a drive power source, a transmission, and a torque converter that is equipped with a lockup clutch and is provided between the drive power source and the transmission, comprising:
 a detection unit that detects an actual revolution speed indicating a real revolution speed of the drive power source; and
 a control unit that controls the lockup clutch so that a state of the lockup clutch becomes any state from among a disengaged state, an engaged state, and a slip state that is intermediate between the disengaged state and the engaged state, wherein the control unit determines, based on a state of the vehicle, whether to execute a slip control for controlling the lockup clutch to the slip state, sets a target revolution speed indicating a target value of the revolution speed of the drive power source on the basis of the state of the vehicle, and when executing the slip control, compares the actual revolution speed with the target revolution speed, and feedback controls a transmission torque of the lockup clutch on the basis of a comparison result of the actual revolution speed and the target revolution speed so as to cause the actual revolution speed to follow the target revolution speed.

2. The controller according to claim 1, wherein in a case where the control unit executes the slip control, when the actual revolution speed is lower than the target revolution speed, the control unit reduces the transmission torque of the lockup clutch, and when the actual revolution speed is higher than the target revolution speed, the control unit increases the transmission torque of the lockup clutch.

3. The controller according to claim 1, wherein the control unit sets a fuel consumption optimum speed at which a fuel consumption ratio of the power source drive becomes optimum as the target revolution speed according to a travel state of the vehicle, and when executing the slip control, controls the transmission torque of the lockup clutch so as to cause the actual revolution speed to follow the fuel consumption optimum speed.

4. The controller according to claim 1, wherein in a case where the control unit executes the slip control, when the actual revolution speed is lower than the target revolution speed, the control unit reduces the transmission torque of the lockup clutch at a first variation rate, and when the actual revolution speed is higher than the target revolution speed, the control unit increases the transmission torque of the lockup clutch at a second variation rate that is smaller in absolute value than the first variation rate.

5. The controller according to claim 1, wherein the control unit executes the slip control when the vehicle starts moving.

6. The controller according to claim 1, wherein the transmission is a continuously variable transmission.

7. The controller according to claim 1, wherein
the vehicle is provided with a valve that regulates the transmission torque of the lockup clutch by outputting a hydraulic pressure corresponding to a given hydraulic pressure command value to the lockup clutch, and
in a case where the control unit executes the slip control, when the actual revolution speed is lower than the target revolution speed, the control unit changes the hydraulic pressure command value by a value obtained by multiplying an absolute value of a difference between the actual revolution speed and the target revolution speed by a first gain in the direction of reducing the transmission torque of the lockup clutch, and when the actual revolution speed is higher than the target revolution speed, the control unit changes the hydraulic pressure command value by a value obtained by multiplying the absolute value of the difference between the actual revolution speed and the target revolution speed by a second gain that is smaller in absolute value than the first gain in the direction of increasing the transmission torque of the lockup clutch.

8. The controller according to claim 1, wherein the control unit sets the target revolution speed on the basis of a vehicle speed and an accelerator depression amount.

9. The controller according to claim 1, wherein in a case where the control unit executes the slip control, when the actual revolution speed is lower than the target revolution speed, the control unit decreases the transmission torque of the lockup clutch at a third variation rate, and when the actual revolution speed is higher than the target revolution speed, the control unit increases the transmission torque of the lockup clutch at a variation rate that is equal in absolute value to the third variation rate.

10. A controller for a vehicle having installed thereon a drive power source, a transmission, and a torque converter that is equipped with a lockup clutch and is provided between the drive power source and the transmission, comprising:
a detection unit that detects an actual revolution speed indicating a real revolution speed of the drive power source; and
a control unit that controls the lockup clutch so that a state of the lockup clutch becomes any state from among a disengaged state, an engaged state, and a slip state that is intermediate between the disengaged state and the engaged state, wherein
the control unit includes:
a determination unit that determines, based on a state of the vehicle, whether to execute a slip control for controlling the lockup clutch to the slip state;
a setting unit that sets a target revolution speed indicating a target value of the revolution speed of the drive power source on the basis of the state of the vehicle; and
a feedback control unit that, when executing the slip control, compares the actual revolution speed with the target revolution speed and feedback controls a transmission torque of the lockup clutch on the basis of a comparison result of the actual revolution speed and the target revolution speed so as to cause the actual revolution speed to follow the target revolution speed.

11. A control method performed by a controller for a vehicle having installed thereon a drive power source, a transmission, and a torque converter that is equipped with a lockup clutch and is provided between the drive power source and the transmission, comprising:
detecting an actual revolution speed that indicates a real revolution speed of the drive power source, and
controlling the lockup clutch so that a state of the lockup clutch becomes any state from among a disengaged state, an engaged state, and a slip state that is intermediate between the disengaged state and the engaged state, wherein
the process of controlling the lockup clutch includes:
determining, based on a state of the vehicle, whether to execute a slip control for controlling the lockup clutch to the slip state;
setting a target revolution speed indicating a target value of the revolution speed of the drive power source on the basis of the state of the vehicle; and
when executing the slip control, comparing the actual revolution speed with the target revolution speed and feedback controlling a transmission torque of the lockup clutch on the basis of a comparison result of the actual revolution speed and the target revolution speed so as to cause the actual revolution speed to follow the target revolution speed.

* * * * *